US 6,558,147 B1

(12) United States Patent
Tatsuta et al.

(10) Patent No.: US 6,558,147 B1
(45) Date of Patent: May 6, 2003

(54) MOLDING DEVICE FOR MOLDING ROTATOR

(75) Inventors: Koji Tatsuta, Oita (JP); Kenji Shimizu, Tokyo (JP); Hideki Suehiro, Oita (JP)

(73) Assignee: Calsonic Kansei Corporation, Tokyo (JP)

( * ) Notice: Subject to any disclaimer, the term of this patent is extended or adjusted under 35 U.S.C. 154(b) by 154 days.

(21) Appl. No.: 09/657,551

(22) Filed: Sep. 8, 2000

(30) Foreign Application Priority Data

Sep. 10, 1999 (JP) ............................. 11-256500

(51) Int. Cl.[7] .................. B29C 33/12; B29C 45/14; B29C 45/36
(52) U.S. Cl. ..................... 425/125; 249/63; 249/83; 249/88; 249/155; 425/468; 425/577
(58) Field of Search ................. 249/63, 83, 88, 249/155; 425/116, 125, 126.1, 577, 468

(56) References Cited

U.S. PATENT DOCUMENTS

| 2,107,136 | A | * | 2/1938 | Zaiger | 425/468 |
|---|---|---|---|---|---|
| 3,700,372 | A | * | 10/1972 | Lalley | 425/577 |
| 4,047,692 | A | | 9/1977 | Swin, Sr. | |
| 4,107,257 | A | * | 8/1978 | Swin, Sr. | 264/275 |
| 4,224,976 | A | * | 9/1980 | Blazek | 249/157 |
| 5,034,170 | A | * | 7/1991 | Briggs et al. | 425/577 |
| 5,409,656 | A | * | 4/1995 | Naruse et al. | 425/468 |
| 5,547,365 | A | * | 8/1996 | Chuang | 425/577 |
| 5,688,537 | A | | 11/1997 | Brams et al. | |
| 6,168,734 | B1 | * | 1/2001 | Botros | 249/155 |

FOREIGN PATENT DOCUMENTS

| GB | 2 259 475 A | | 3/1993 | |
|---|---|---|---|---|
| JP | 5-116186 | | 5/1993 | |
| JP | 05208425 A | * | 8/1993 | ........... B29C/45/14 |

* cited by examiner

Primary Examiner—Robert Davis
(74) Attorney, Agent, or Firm—Foley & Lardner

(57) ABSTRACT

A molding device is provided for molding a blower fan that has a center member embedded in a center portion of the fan. The molding device comprises a pair of molding dies which define therebetween a shaped cavity when properly coupled; and an insert die fixed to one of the pair of molding dies in such a manner that at least a part of the insert die is exposed to a shaped cavity that is produced when the molding dies are coupled. The insert die includes a base block secured to one of the pair of molding dies; a cylindrical holding bore defined by the base block; a plurality of cylindrical eccentric members having eccentric through bores whose eccentric degrees are different from one another, each eccentric member being sized to be intimately received in the cylindrical holding bore; a positioning structure that establishes angular positioning of the cylindrical eccentric members.

20 Claims, 14 Drawing Sheets

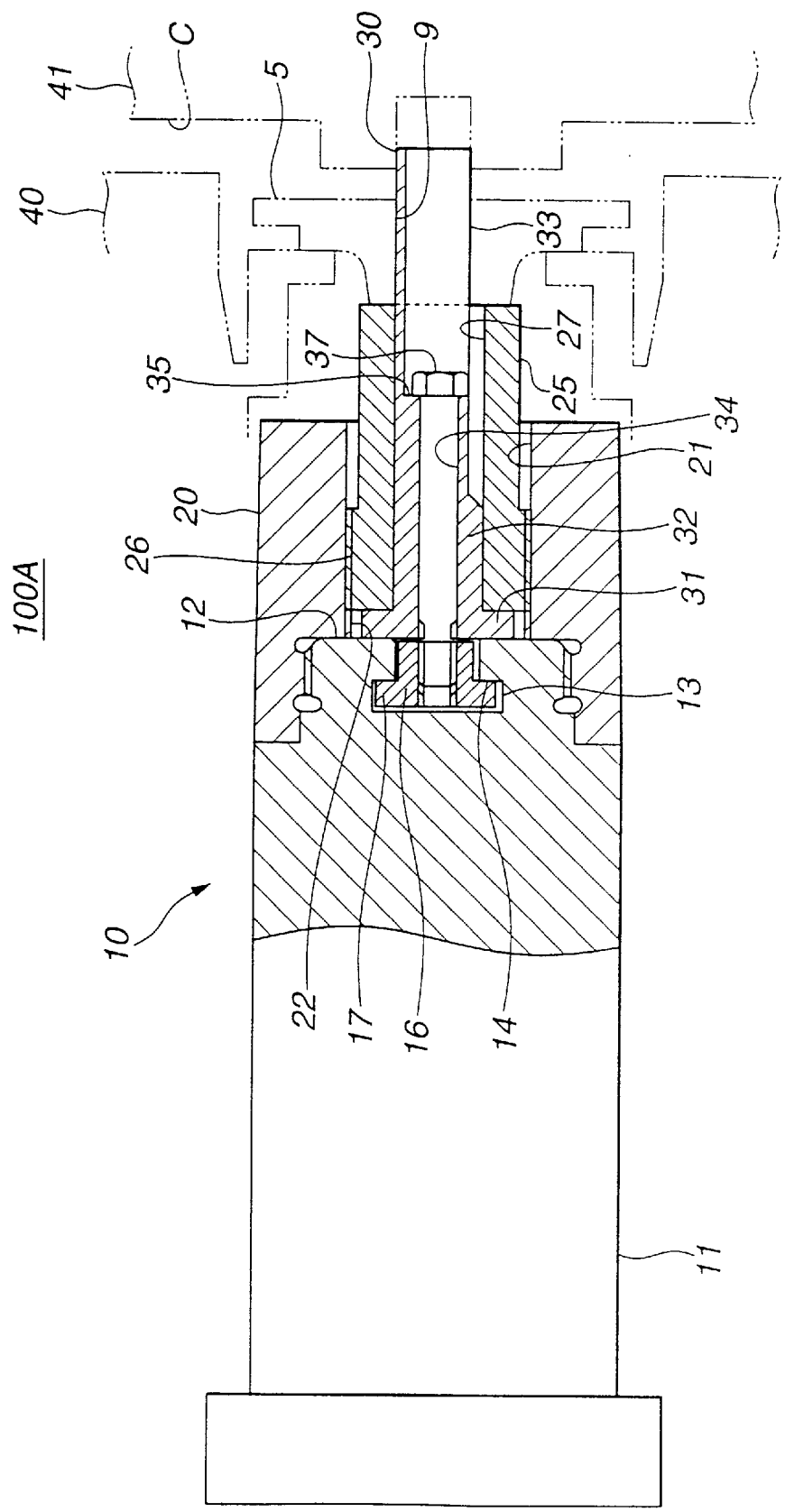

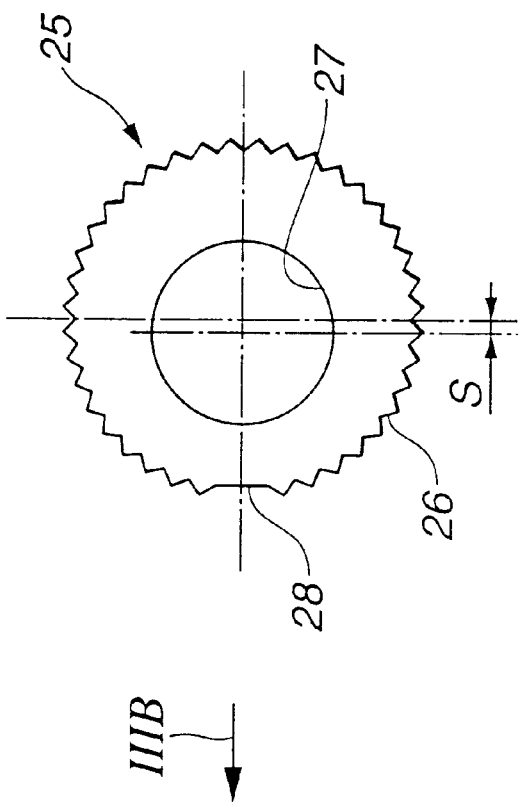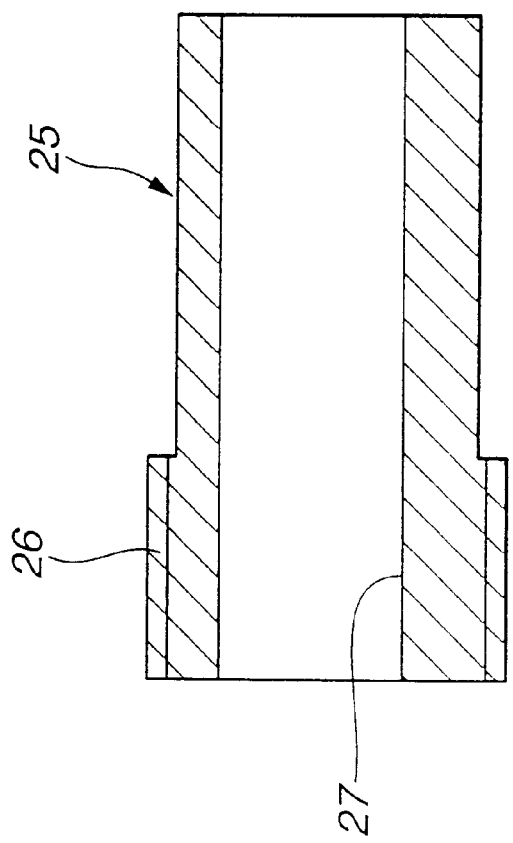

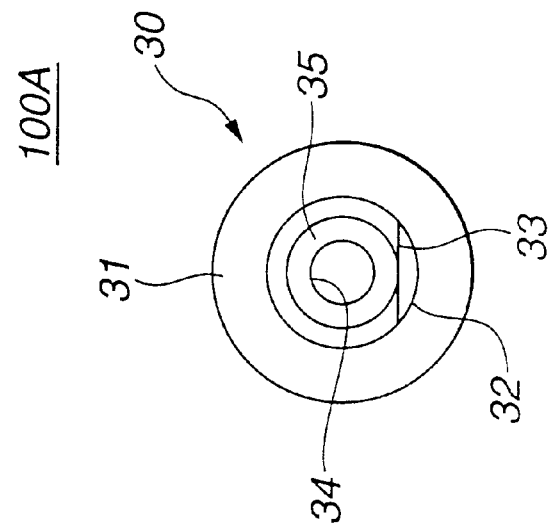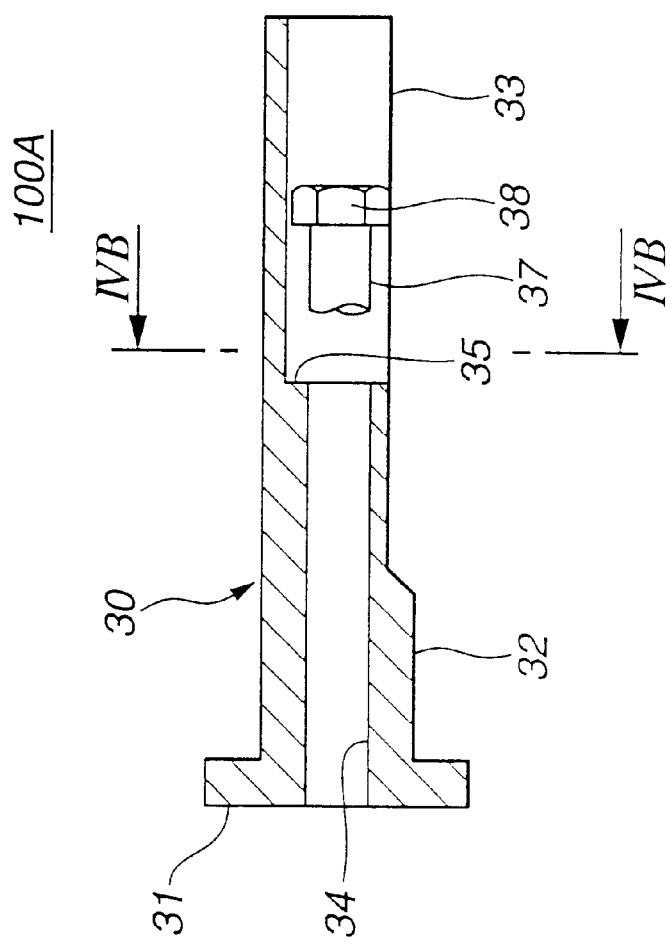

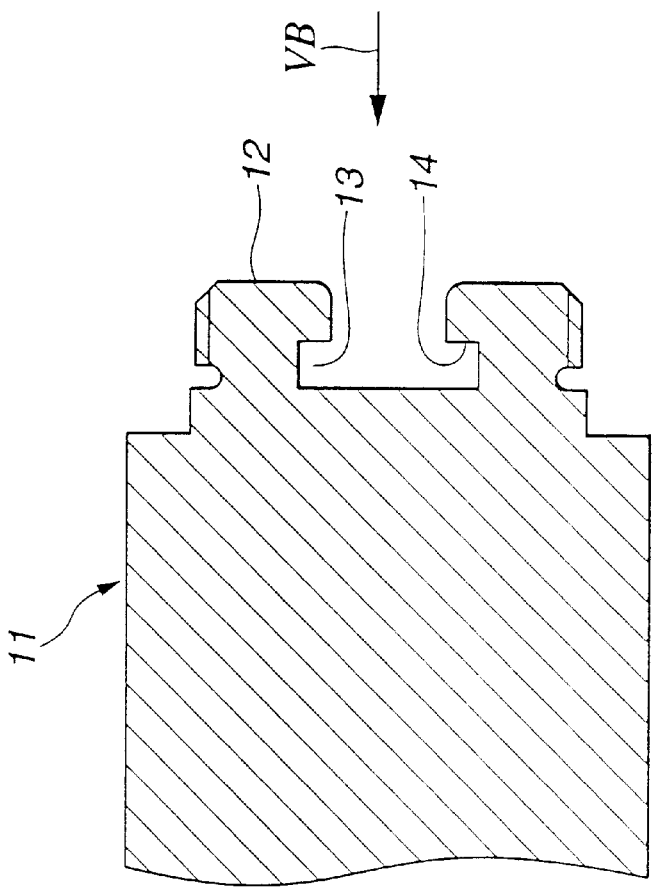
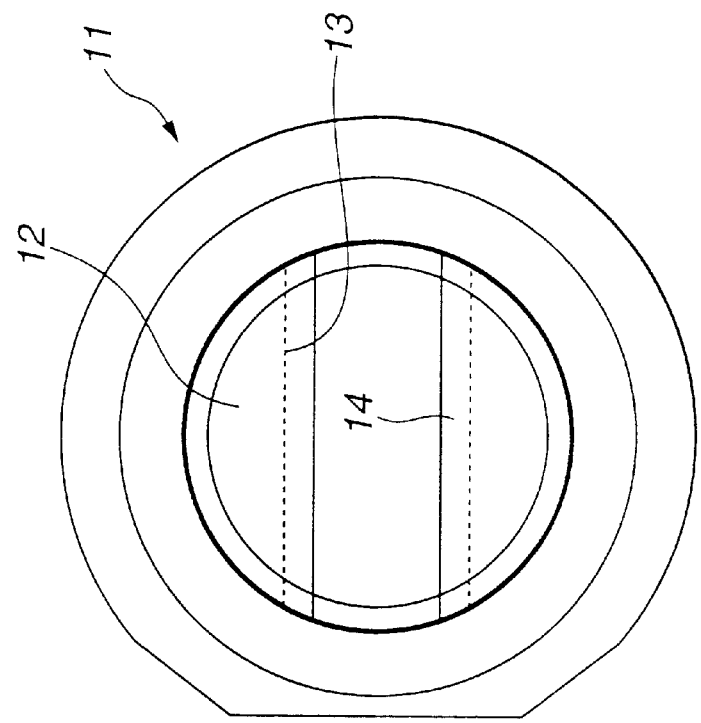
FIG.5(a)
FIG.5(b)

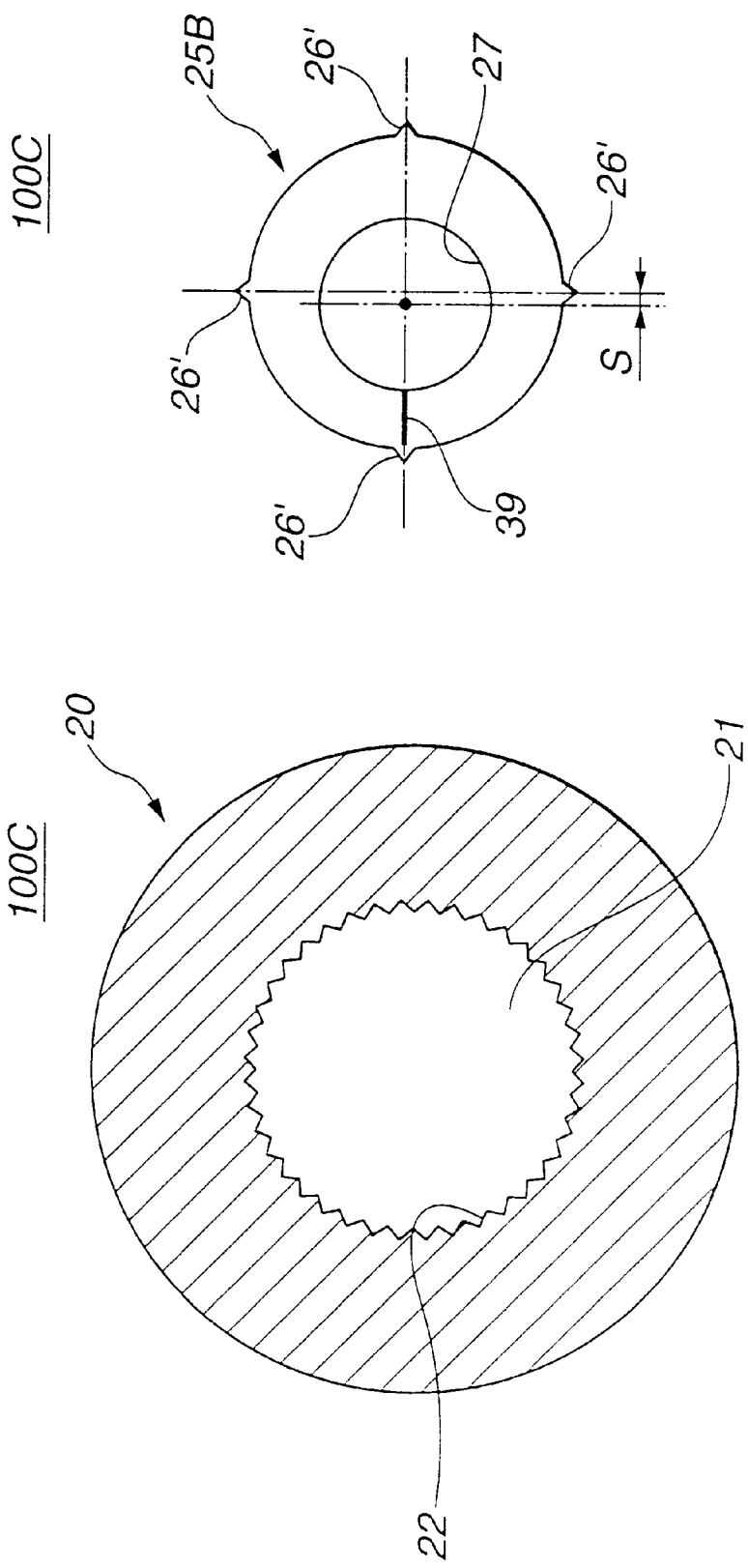

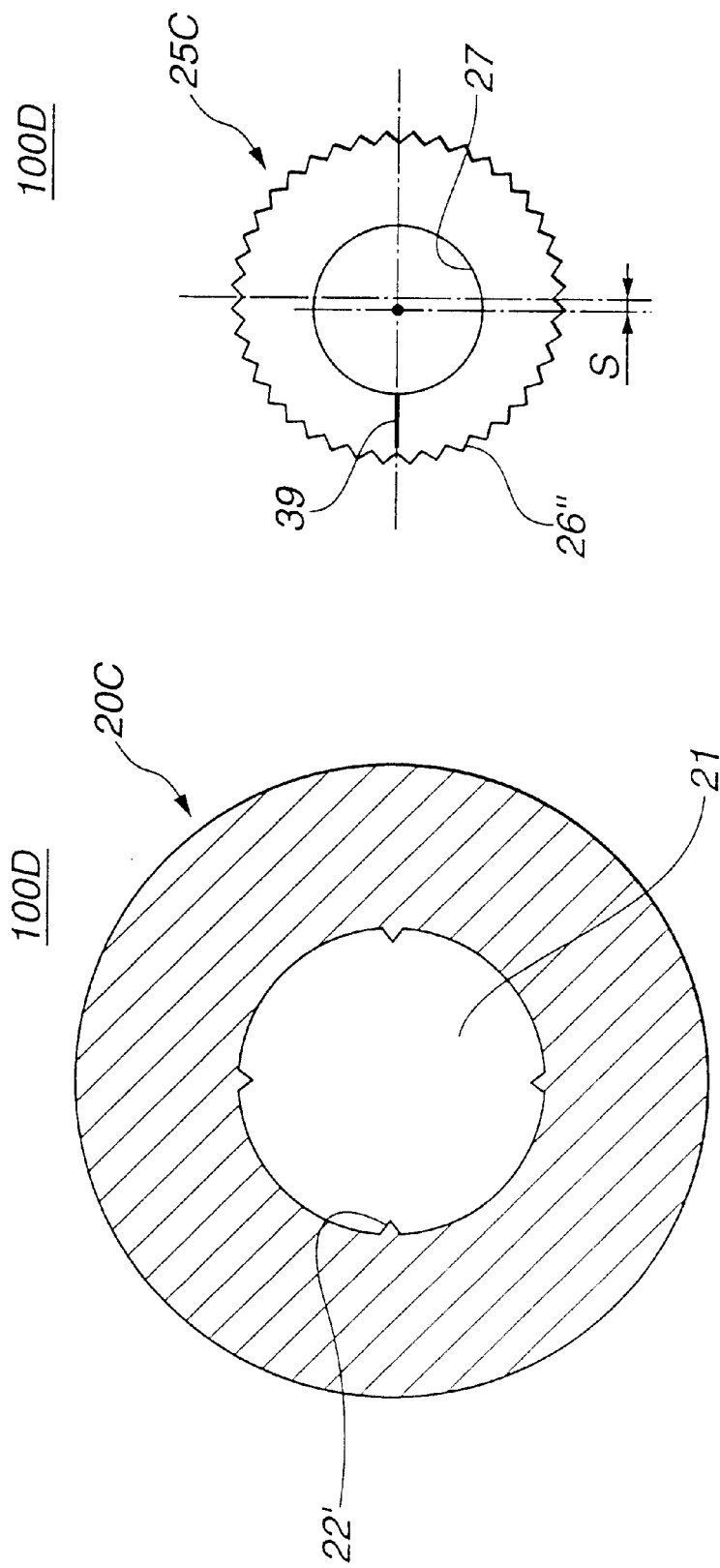

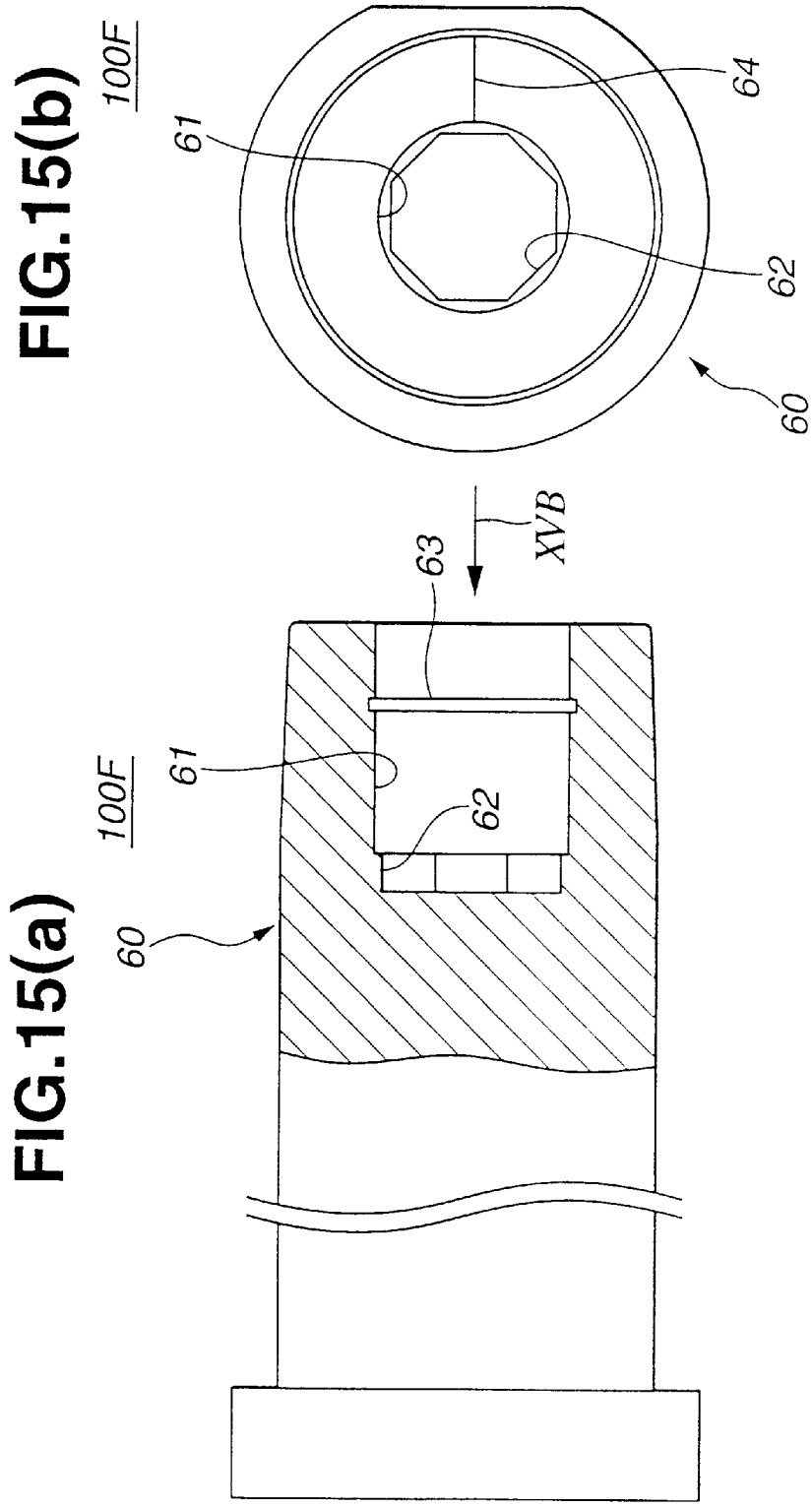

MOLDING DEVICE FOR MOLDING ROTATOR

BACKGROUND OF THE INVENTION

1. Field of the Invention

The present invention relates in general to a molding device and a molding method for molding rotators, such as, a plastic blower fan and the like, and more particularly to a molding device and a molding method for molding plastic rotators of a type that has a center member embedded in a boss portion thereof integrally. More specifically, the present invention relates to improvement in the molding device and molding method by which undesired out-of-centering of the center member relative to the boss portion of the rotator is suppressed or at least minimized.

2. Description of the Prior Art

Among various rotators, there is an automotive blower fan made of synthetic resin, that comprises generally a center boss portion, a plurality of blades radially outwardly projecting from the center boss portion and a die-cast center member integrally embedded in the center boss portion.

For molding such blower fan through an injection molding technique, there has been used a molding device or mold assembly which generally comprises a movable die and a fixed die. Each die has a recess shaped coincident with the external form of one side of a product, that is, the produced bower fan. The movable die comprises a die proper sized to cover the entirety of the produced fan, a recessed center portion formed in the die proper for shaping the center boss portion of the fan, a nested structure formed around the recessed center portion and a center pin projected from the nested structure. The movable die is mountable on the fixed die to define therebetween a cavity that is shaped in coincidence with the external form of the produced fan.

In injection molding, a center member is received on the center pin and the two dies are coupled together tightly. Then, a measured amount of molten resin is poured or injected into the shaped cavity of the die assembly. When the resin is cooled to have a suitable hardness, the two dies are uncoupled to release the product, that is, the blower fan. In this molding, however, the product tends to suffer undesired out-of-centering of the center member relative to the center boss portion of the produced fan.

In order to prevent or at least minimize this undesired out-of-centering of the center member, various measures have been proposed and put into practical use. One of them is shown in Japanese Patent First Provisional Publication 5-116186. In this measure, a positioning device is arranged between the fixed and movable dies, that generally comprises a positioning pin secured to the fixed die and a positioning opening formed in the movable die. Upon coupling of the two dies, the positioning pin is inserted into the positioning opening to assure a relative positioning between the two dies. With this, adequate centering of the center member relative to the center boss portion of the fan is obtained.

However, due to its inherent construction, even the positioning device of the publication has failed to provide the mold operators with satisfaction. That is, it is very difficult and at least troublesome to accurately fix the positioning pin to a right position of the fixed die. In fact, in the disclosed positioning device, four connecting bolts are used for securing the positioning pin to the fixed die. Of course, if such fixing is roughly made, precise positioning between the two dies and thus between the center member and the center boss portion of the produced fan is not expected.

SUMMARY OF THE INVENTION

It is therefore an object of the present Invention to provide a molding device for molding a rotator, which can eliminate the above-mentioned out-of-centering of the center member.

It is another object of the present invention to provide a method for molding a rotator, which can eliminate the above-mentioned out-of-centering of the center member.

According to a first aspect of the present invention, there is provided a molding device for molding a rotator that has a center member embedded in a given portion of the rotator. The molding device comprises a pair of molding dies which define therebetween a shaped cavity when properly coupled, the cavity being a cavity into which a molten resin is injected upon molding of the rotator; an insert die fixed to one of the pair of molding dies in such a manner that at least a part of the insert ale is exposed to the shaped cavity when the molding dies are coupled, the insert die including a base block secured to one of the pair of molding dies; a cylindrical holding bore defined by the base block; a plurality of cylindrical eccentric members having eccentric through bores whose eccentric degrees are different from one another, each eccentric member being sized to be intimately received in the cylindrical holding bore; a positioning structure that establishes an angular positioning of selected one of the cylindrical eccentric members in the cylindrical holding bore relative to the base block; a center pin adapted to carry thereon the center member for placing the center member in the shaped cavity when the paired molding dies are coupled, the center pin having one end portion intimately received in the eccentric through bore of the cylindrical eccentric member held in the cylindrical holding bore; and a fixing structure that fixes the center pin to the base block.

According to a second aspect of the present invention, there is provided a method of molding a rotator that has a center member embedded in a given portion of the rotator. The method comprises the steps of (a) preparing a molding device that includes a pair of molding dies, an insert die block fixed to one of the molding dies, a center pin detachably held by the insert die block and a plurality cylindrical eccentric members, the cylindrical eccentric members having eccentric through bores whose eccentric degrees are different from one another, one of the cylindrical eccentric members having an eccentric degree of 0 (zero), and each eccentric through bore intimately receiving therein at least a part of the center pin when molding is carried out; (b) coupling the center pin with the cylindrical eccentric member of 0 (zero) eccentric degree, fixing the couple to the insert die block and setting a center member on the center pin; (c) molding a rotator using the molding die that is incorporated with the couple and the center member; (d) repeating the step (c) while changing the center member to mold a plurality of rotators; (e) measuring imbalance degree of each of the molded rotators with respect to an ideal structure of the rotor, and calculating an average value of the measured imbalance degrees; (f) selecting one of the cylindrical eccentric members and deriving a correction angle needed by the selected cylindrical eccentric member with reference to the calculated average value, the combination of the selected cylindrical eccentric member and the derived correction angle being effective for eliminating the imbalance or at least minimizing the imbalance degree; (g) changing the originally set cylindrical eccentric member of 0 (zero) eccentric degree with the selected cylindrical eccentric member (h) establishing a desired angular positioning of the selected cylindrical eccentric member relative to the insert die block with respect to the derived correction angle; (i) fixing the new couple including the selected cylindrical eccentric member and the center pin to the insert die block and setting a center member on the center pin; and (j) molding a rotator using the molding die that is incorporated with the new couple and the center member.

BRIEF DESCRIPTION OF THE DRAWINGS

Other objects and advantages of the present invention will become apparent from the following description when taken in conjunction with the accompanying drawings, in which:

FIG. 2 is an enlarged sectional view of an insert die installed in a molding device which is a first embodiment of the present invention;

FIG. 3(a) is an axially sectioned view of an eccentric member which is employed in the first embodiment;

FIG. 3(b) is a diametrically sectioned view of the eccentric member of FIG. 3(a), the view being taken from the direction of the arrow "IIIB" of FIG. 3(a);

FIG. 4(a) is an axially sectioned view of a center pin employed in the first embodiment;

FIG. 4(b) is a sectional view taken along the line "IVB—IVB" of FIG. 4(a);

FIG. 5(a) is an axially sectioned view of a right portion of a base block employed in the first embodiments;

FIG. 5(b) is an enlarged view taken from the direction of the arrow "VD" of FIG. 5(a);

FIG. 9(a) is a diametrically sectioned view of a cap member employed in an insert die installed in a molding device which is a third embodiment of the present invention;

FIG. 9(b) is an end view of an eccentric member employed in the insert die Installed in the molding device of the third embodiment;

FIG. 10(a) is a diametrically sectioned view of a cap member employed in an insert die installed in a molding device which is a fourth embodiment of the present invention;

FIG. 10(b) is an end view of an eccentric member employed in the insert die installed in the molding device of the fourth embodiment;

FIG. 15(a) is a partially sectioned view of a base block employed in the sixth embodiment;

FIG. 15(b) is an end view of the base block of FIG. 15(a), the view being taken from the direction of the arrow "XVB" of FIG. 15(a);

DETAILED DESCRIPTION OF THE INVENTION

In the following, the present invention will be described in detail with reference to the accompanying drawings. For ease of understanding, the following description will include various directional terms, such as right, left, upward, downward, rightward, leftward and the like. However, it is to be noted that such terms are to be understood with respect to a drawing or drawings on which the corresponding portion or part is shown.

Figure 1A:
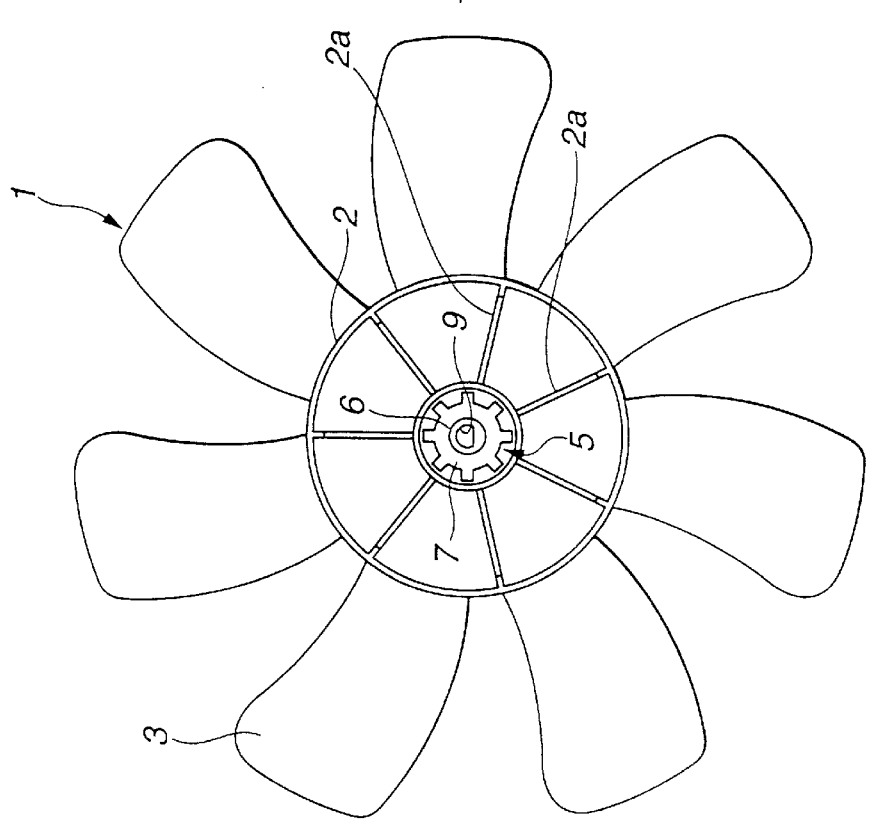
FIG. 1(a) is a plan view of a blower fan which is produced through a molding device of the present invention, the view being taken from the direction of the arrow "IA" of FIG. 1(b)
Figure 1B:
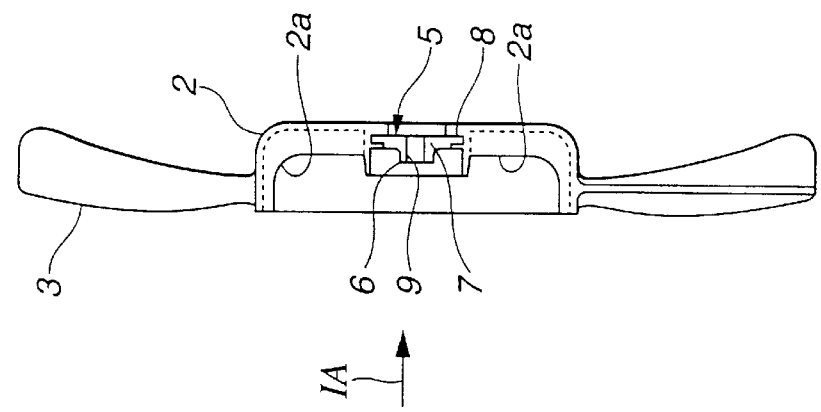
FIG. 1(b) is a sectional view of the produced blower fan.

Referring to FIGS. 1(a) and 1(b), there is shown a blower fan 1 of synthetic resin, which is produced through a molding device of the present invention. For producing the fan 1, an injection molding technique is employed, as will become apparent hereinafter.

As shown, the fan 1 comprises a circular center boss portion 2 which is shaped like a cup and a plurality of blades 3 which radially outwardly project from the center boss portion 2. The cup-shaped center boss portion 2 is formed with a plurality of reinforcing beams 2a for reinforcement thereof. In the center area of the boss portion 2, there is integrally embedded a die-cast center member 5. The center member 5 is formed with a center bore 9 of D-shaped section into which an output shaft of an electric motor (not shown) is inserted. Thus, when the motor is energized, the fan 1 is rotated about an axis of the output shaft.

As is seen from FIG. 1(b), the die-cast center member 5 comprises a shaft portion 6 and an enlarged disc portion 7 which are coaxially connected and integrated. As shown in FIG. 1(b), the center bore 9 passes through both the shaft portion 6 and the disc portion 7. As is seen from FIGS. 1(a) and 1(b), a peripheral part of the disc portion 7 is formed at a back surface thereof with a plurality of equally spaced recesses 8. Upon injection molding, molten resin flows to the front and back surfaces of the peripheral part, so that the disc portion 7 and thus the center member 5 is integrally embedded in the center area of the boss portion 2 of the produced fan 1.

Referring to FIG. 2, there is shown an essential portion of a molding device 100A which is a first embodiment of the present invention.

In the drawing, denoted by numerals 40 and 41 are movable and fixed molding dies. When the movable die 40 is properly coupled with the fixed die 41, there is defined therebetween a cavity "C" that is shaped in coincidence with the external form of the above-mentioned blower fan 1.

An insert die 10 is connected to the movable die 40 to move therewith. As shown, the insert die 10 comprises a cylindrical base block 11 which has a left end secured to the movable die 40. The base block 11 has a smaller diameter right end portion that is externally threaded.

A cap member 20 is detachably connected to the smaller right end portion of the base block 11 by engaging its inwardly threaded portion with the threaded smaller right end portion. As shown, the base block 11 and the cap member 20 have the same outer diameter. The cap member 20 is formed with a cylindrical through bore 21 that extends axially.

A cylindrical inner wall of the through bore 21 is formed at its left half with a serrated portion 22. That is, the left half of the inner wall is formed with a plurality of parallel teeth or ridges that extend along the axis of the through bore 21.

A cylindrical eccentric member 25 is received in the through bore 21. The eccentric member 25 is formed with a serrated left portion 26 that is operatively engaged with the serrated portion 22 of the through bore 21. Thus, the eccentric member 25 can slide axially relative to the cap member 20 while being prevented from rotation about the axis.

As is well seen from FIGS. 3(a) and 3(b), the cylindrical eccentric member 25 is formed with an eccentric through bore 27. That is, the bore 27, is eccentric relative to the axis of the eccentric member 25.

Referring back to FIG. 2, the cylindrical eccentric member 25 has a right portion projected outward beyond the tight end of the cap member 20.

As will become apparent as the description proceeds, in the invention, a plurality of different eccentric members 25 are prepared. That is, as is seen from FIG. 3(b), the eccentric members 25 have eccentric through bores 27 whose eccentric degrees "S" are different from one another. The eccentric through bores 27 of the eccentric members 25 may have eccentric degrees "S" which are, for example, 0 mm, 0.05 mm, 0.10 mm, 0.15 mm, 0.20 mm, 0.25 mm and 0.30 mm.

Figure 7:
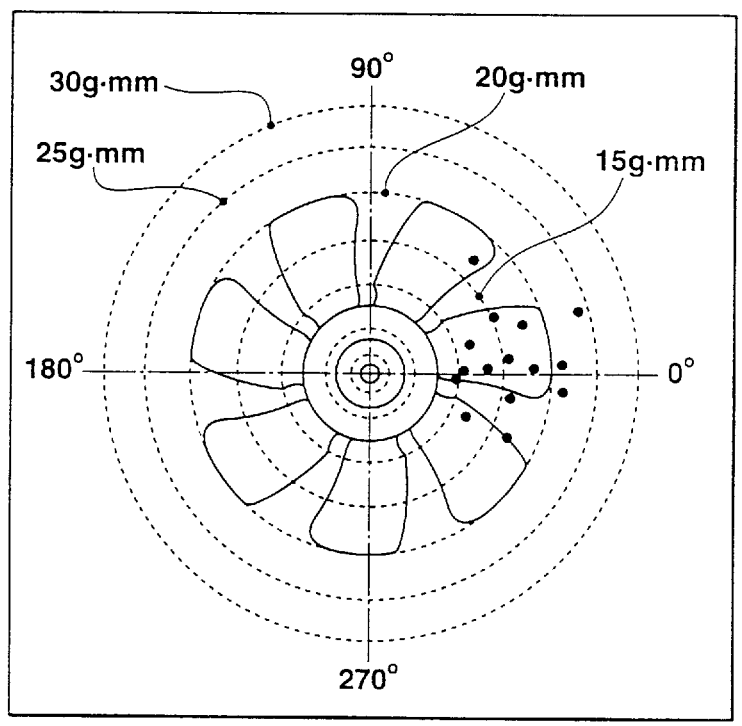
FIG. 7 is a distribution map showing imbalance degrees of blower fans that were produced through a temporary molding.

As shown in FIG. 3(b), one or two teeth of the serration 26 of each eccentric member 25 are removed to provide a flat area 28 that serves as an eccentric indication mark that indicates the direction in which the eccentric member 25 shows the maximum eccentricity thereof. That is, as will become apparent hereinafter, before insertion of a selected eccentric member 25 into the through bore 21 of the cap member 20, angular position adjustment of the selected eccentric member 25 relative to the through bore 21 is made with reference to the eccentric indication mark 28 and a reference mark possessed by the cap member 20. As will be understood hereinafter, the reference mark corresponds to a reference point (for example, the point of 0 degree of FIG. 7) of an imaginary circle described by a molded rotator.

Once the serration 26 of the eccentric member 25 is engaged with the serration 22 of the through bore 21 of the cap member 20, the angular position of the eccentric member 25 becomes fixed relative to the cap member 20 and thus relative to the base block 11.

As is shown in FIG. 2, within the eccentric through bore 27 of the cylindrical eccentric member 25, there is inserted a center pin 30. An exposed left end of the center pin 30 is formed with a flange 31 that is sandwiched between the left end of the eccentric member 25 and the smaller right end of the cylindrical bass block 11. A right portion of the center pin 30 is largely projected from the right end of the eccentric member 25, as shown.

As is seen from FIGS. 2, 4(a) and 4(b), particularly from FIGS. 2 and 4(a), the center pin 30 comprises a cylindrical left portion 32 which is intimately disposed in the eccentric through bore 27 of the eccentric member 25 and extends rightward from the flange 31 by a length corresponding to the length of the serrated portion 26 of the eccentric member 25, and a D-sectioned elongate right portion 33 which extends rightly from the cylindrical left portion 32 beyond the eccentric member 25 and is to be intimately disposed in the center bore 9 of the center member 5.

The center pin 30 is formed with a bolt bore 34 that extends along the axis thereof. As is seen from FIG. 4(a), the bolt bore 34 terminates at a generally middle portion of the center pin 30 where a seat 35 for seating a head 38 of a bolt 37 is formed, thus, the head 38 of the bolt 37 is permitted to axially move along the D-sectioned elongate portion 33 of the center pin 30 between the seat 35 and the right end of the center pin 30.

As will become apparent hereinafter, by changing the eccentric member 25 received in the bore 21 of the cap member 20, the position of the center pin 30 relative to the base block 11 changes.

As is seen from FIGS. 2, 5(a) and 5(b), the smaller right end portion of the base block 11 is formed with a groove 13 that extends perpendicular to the axis of the base block 11. As shown, the groove 13 has a generally T-shaped cross section to receive a slide nut 16.

Figure 6B:
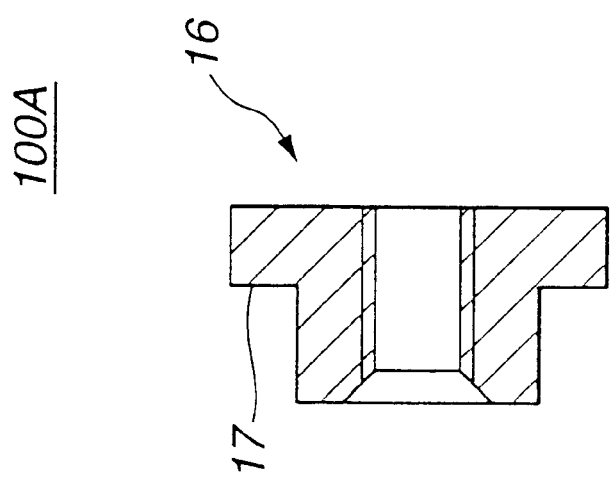
FIG. 6(b) is a sectional view taken along the line "VIB—VIB" of FIG. 6(a)
Figure 6A:
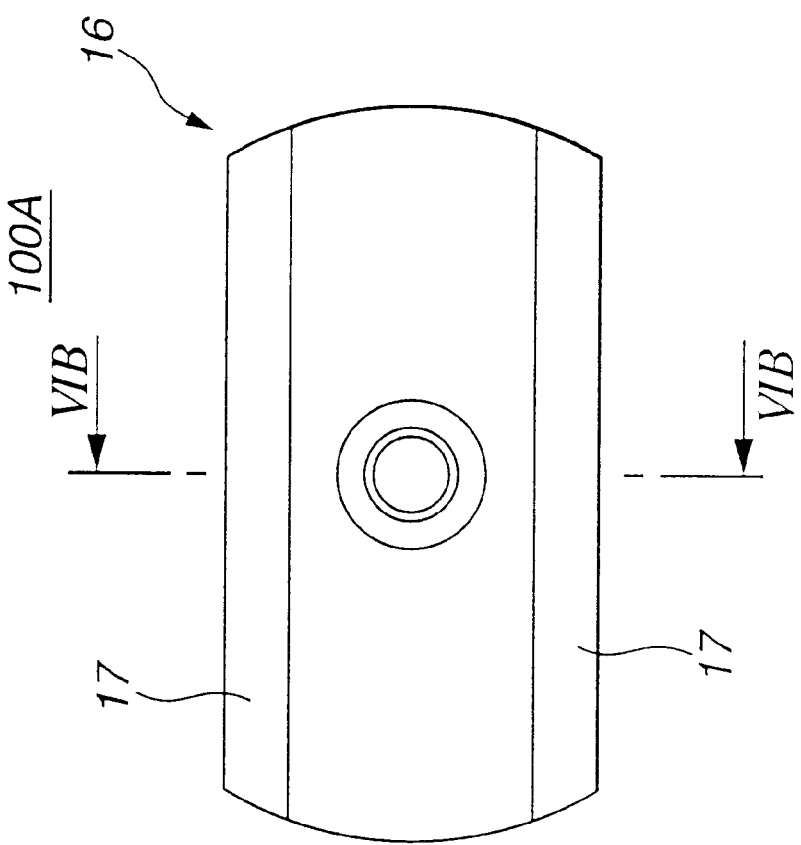
FIG. 6(a) is front view of a side nut employed in the first embodiment.

The detail of the slide nut 16 is shown In FIGS. 6(a) and 6(b). As shown, the slide nut 16 comprises a threaded bore (no numeral) and upper and lower parallel flanges 17.

As is seen from FIG. 2, the slide nut 16 is slid into the groove 13 and held in a center position with the threaded bore coaxially mated with the bolt bore 34 of the center pin 30. A threaded left end of the bolt 37 in the bolt bore 34 is engaged with the threaded bore of the slide nut 16. The groove 13 is so sized as to permit a slight displacement of the slide nut 16 therein. That is, slide nut 16 can slightly move in an axial direction and in a lateral direction (that is, the direction perpendicular to the face of FIG. 2). When the bolt 37 in the bolt bore 34 is turned in a fixing direction by a suitable tool, the threaded left end of the bolt 37 becomes fixed to the slide nut 16 thereby fixing the center pin 30 to the base block 11.

That is, when the bolt 37 is fastened, the flange 31 of the center pin 30 is pressed against the right surface 12 of the base block 11 and at the same time, the flanges 17 of the slide nut 16 are pressed against the opposing surfaces 14 of the groove 13 of the base block 11. With this, the center pin 30 becomes fixed to the base block 11.

As has been mentioned hereinabove, the insert die 10 is fixed at its left part to the movable die 40 (see FIG. 2). Before carrying our molding of the fan 1, the center member 5 is inserted on the center pin 30 from the right end of the same, as will be shown by a phantom line. It is to be noted that due to the D-shaped section of the center bore 9 of the center member 5 with which the D-sectioned elongate portion 33 of the center pin 30 is engaged, rotation of the center member 5 about the axis of the center member 5 is suppressed. When the center member 5 is properly set on the center pin 30 and the movable die 40 is coupled with the fixed die 41, a measured amount of molten resin is injected into the cavity "C" defined between the coupled movable and fixed dies 40 and 41. When the resin is cooled to have a certain hardness, the two dies 40 and 41 are uncoupled to release the product, that is, the fan 1.

In the following, a method of molding a blower fan 1 that is free of the above-mentioned undesired out-of-centering of the center member 5 will be described with reference to the drawings.

First, a temporary molding is carried out for the purpose of finding a structural peculiarity inevitably possessed by the molding device 100A. That is, using the eccentric member 25 having 0 mm in the eccentric degree "S", a plurality (for example, 15 or so) of blower fans 1 are molded. In this case, there is no need of giving attention to the angular adjustment of the eccentric member 25 relative to the cap member 20 because the through bore 27 of the eccentric member 25 with 0 mm in the eccentric degree "S" is coaxial with the through bore 21 of the cap member 20.

Then, imbalance degree is measured on each of the produced fans 1 with respect to an ideal structure of a proper fan 1. As is seen from the distribution map of FIG. 7, the imbalance degree is represented by combination of the degree of displacement and its direction. Then, an average value of the measured imbalance degrees is derived. Then, by looking up a reference map that shows relationship between the imbalance degree, the eccentric degree "S" and a correction angle, one of the seven eccentric members 25 (whose eccentric degrees "S" are 0 mm, 0.05 mm, 0.10 mm, 0.15 mm, 0.20 mm, 0.25 mm and 0.30 mm) is selected and a correction angle needed by the selected eccentric member 25 is derived of course, if the derived averaged value of the measured imbalance degrees is too small, the eccentric member 25 that has been used for the tentative production can be consecutively used for a subsequent production of proper fans 1.

When the desired eccentric member 25 is selected, the bolt 37 (see FIG. 2) is loosened to remove the eccentric member 25 that has been used for producing the tentative fans 1. The eccentric member 25 can be easily pulled out from the cap member 20 when pulled rightward. For removing the eccentric member 25, there is no need of completely disengaging the bolt 37 from the slide nut 16. That is, it is only necessary to loosen the bolt 37.

Then, the selected eccentric member 25 is inserted into the through bore 21 of the cap member 20 while sliding on the center pin 30. Before this insertion, angular adjustment of the eccentric member 25 relative to the through bore 21 of the cap member 20 is made based on the derived correction angle with reference to the eccentric indication mark 28 of the eccentric member 25 and the reference mark of cap member 20. When the selected eccentric member 25 is deeply inserted into the cap member 20, the serration 26 of the eccentric member 25 is engaged with the serration 22 of the cap member 20 thereby assuring the positioning of the eccentric member 25 relative to the cap member 20, and thus assuring the positioning of the center pin 30 relative to the base block 11.

During insertion of the selected eccentric member 25 into the cap member 20, the center pin 30 is moved laterally slightly due to the nature of the eccentric through bore 27 possessed by the selected eccentric member 25, and at the same time, the slide nut 16 is also moved in the same direction in the groove 13. Then, the bolt 37 is fastened by using a suitable tool. With this, the center pin 30 is fixed at a desired new position relative to the base block 11. It is now to be noted that the desired new position is the position for the center pin 30, that can cancel or at least minimize the above-mentioned imbalance degree.

Thus, when injection molding is carried out using the mold assembly having the above-mentioned arrangement, a blower fan 1 free of imbalance in structure is produced. That is, undesired out-of-centering of the center member 5 is eliminated. Hitherto, the fraction defective of the production (viz., fan) was 6% to 19% with an allowable imbalance degree being 20 g.mm. However, by using the above-mentioned production method, the fraction defective has been reduced to 0%.

As has been described hereinabove, in the present invention, a plurality of fans 1 are tentatively produced by using the eccentric member 25 of zero-eccentric degree "S", and then imbalance degrees of the fans 1 are measured and an average value of the measured imbalance degrees is derived. Then, by comparing the average value with data shown in a reference map, one of the eccentric members 25 is selected and a correction angle needed by the selected eccentric member 25 is derived. Then, the selected eccentric member 25 is set to the insert die 10 in such a manner that the eccentric member 25 assumes a desired angular position relative to the insert die 10. Then, injection molding is practically carried out for producing proper fans 1. With this, the fans 1 produced are free of the undesired out-of-centering of the center member 5.

The positioning of the center pin 30 is automatically carried out when the selected eccentric member 25 is slid into the bore 21 of the cap member 20 and, once the eccentric member 25 arrives at the deepest position of the bore 21, the positioning of the center pin 30 becomes almost fixed. Thus, subsequent turning of the bolt 37 for fastening the center pin 30 does not cause displacement of the center pin 30 from the set position. That is, the work for fixing the center pin 30 to a desired position is very easy.

Due to provision of the flange 31 that is pressed against the right surface 12 of the base block 11, the center pin 30 can be fixed to the base block 11 with a greater fastening force.

Since the cap member 20 is a separate member that is detachably connected to the base block 11, formation of the bore 21 of the cap member 20 and that of the serration 22 on the inner wall of the bore 21 are easily made.

Furthermore, since the groove 13 for the slide nut 16 extends throughout the entirety of the diameter of the base block 11, the groove 13 can be easily made by using a milling cutter.

Figure 8:
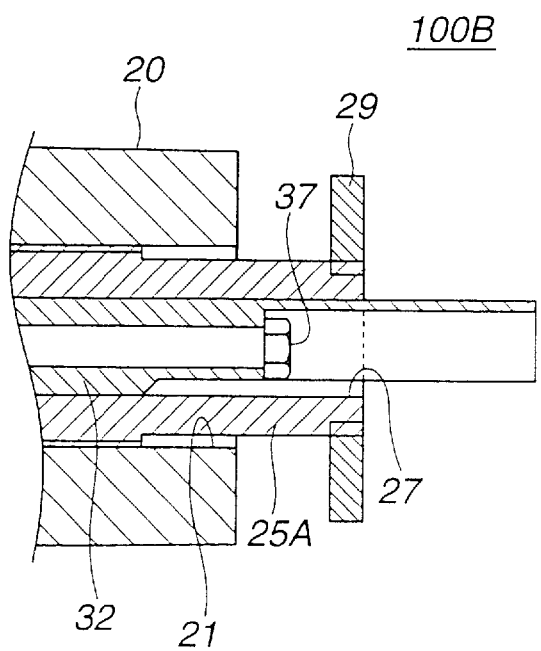
FIG. 8 is an axially sectioned view of an essential portion of an insert die installed in a molding device which is a second embodiment of the present invention.

Referring to FIG. 8, there is shown a second embodiment 100B of the present invention.

In this second embodiment 100B, modified eccentric members 25A are employed. Each modified eccentric member 25A is equipped with a handling flange 29 for facilitating the work for pulling out the eccentric member 25A from the cap member 20. The handling flange 29 is detachably connected to the eccentric member 25A. That is, a screw-in connection is provided between the handling flange 29 and the eccentric member 25A.

Referring to FIGS. 9(a) and 9(b), there is shown a third embodiment 100C of the present invention.

Also in this third embodiment 100C, modified eccentric members 25B are employed, that have different eccentric degrees "S" of the eccentric through bore 27 like in the case of the above-mentioned first embodiment 100A. As is seen from FIG. 9(b), each modified eccentric member 25B has only four axially extending teeth 26' which are arranged about the axis of the member 25B at equally spaced intervals, and each eccentric member 25B has an eccentric indication mark 39 that corresponds to the above-mentioned eccentric indication mark 28. Each tooth 26' extends along the axis of the eccentric member 25B.

When the eccentric member 25B is properly received in the bore 21 of the cap member 20, each tooth 26' of the eccentric member 25B is engaged with an axially extending groove that is defined between adjacent two of the teeth of the serrated portion 22 of the cap member 20. By selecting a desired eccentric member 25B in such a way as has been mentioned in the section of first embodiment 100A, it is possible to mold a fan 1 that is free of the undesired out-of-centering of the center member 5. If desired, each modified eccentric member 25B may have only one tooth 26'. In this case, the eccentric indication mark 39 may be removed since the tooth 26' can serve also as such mark.

Referring to FIGS. 10(a) and 10(b), there is shown a fourth embodiment loon of the present invention.

In this fourth embodiment 100D, a modified cap member 20C and modified eccentric members 25C are employed. As is seen from FIG. 10(a), the modified cap member 20C has only four axially extending teeth 22' which are arranged about the axis of the cap member 20C at equally spaced intervals. Each modified eccentric member 25C is formed thereabout with a plurality of teeth 26' that form a serrated portion, and each modified eccentric member 25C has an eccentric indication mark 39.

When the eccentric member 25C is properly received in the bore 21 of the cap member 20C, each tooth 22' of the cap member 20C is engaged with an axially extending groove that is defined between adjacent two of the teeth 26' of the eccentric member 25C. By selecting a desired eccentric member 25C in such a way as has been mentioned hereinabove, it is possible to mold a fan 1 that is free of the undesired out-of-centering of the center member 5. If desired, the cap member 20C may have only one tooth 22'.

Referring to FIGS. 11(a), 11(b), 12(a), 12(b), 13(a) and 13(b), there is shown a fifth embodiment 100E of the present invention.

Figure 11A:
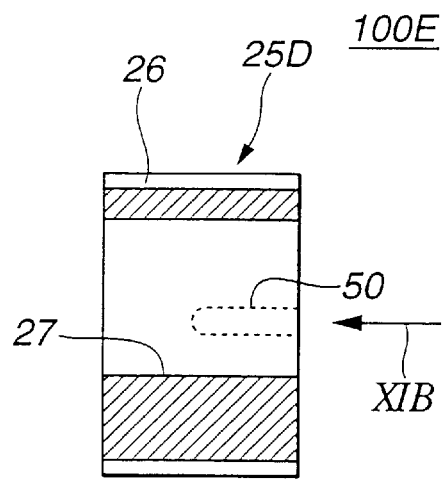
FIG. 11(a) is an axially sectioned view of an eccentric member employed in an insert die installed in a molding device which is a fifth embodiment of the present invention.
Figure 11B:
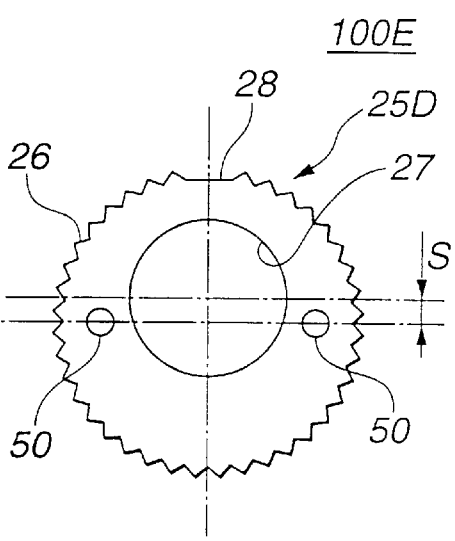
FIG. 11(b) is an end view of the eccentric member of FIG. 11(a), the view being taken from the direction of the arrow "XIB" of FIG. 11(a)
Figure 12A:
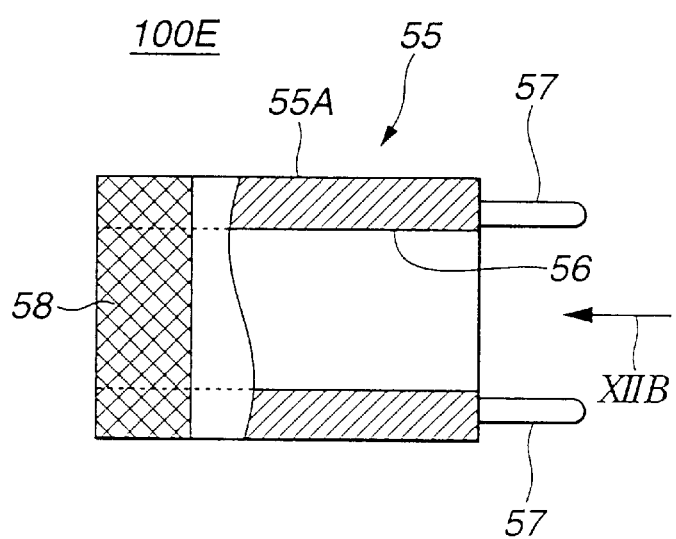
FIG. 12(a) is a partially sectioned front view of a handling tool employed in the fifth embodiment.
Figure 12B:
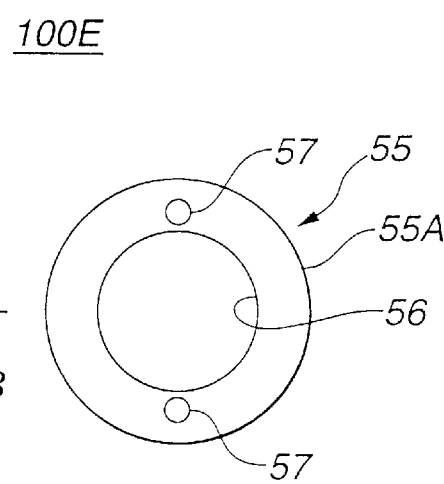
FIG. 12(b) is an end view of the handling tool of FIG. 12(a), the view being taken from the direction of the arrow "XIIB" of FIG. 12(a)

In this fifth embodiment 100E, modified eccentric members 25D as shown in FIGS. 11(a) and 11(b) and a handling tool 55 as shown in FIGS. 12(a) and 12(b) are employed. The handling tool 56 is used for facilitating the work for handling the eccentric members 25D.

Figure 13A:
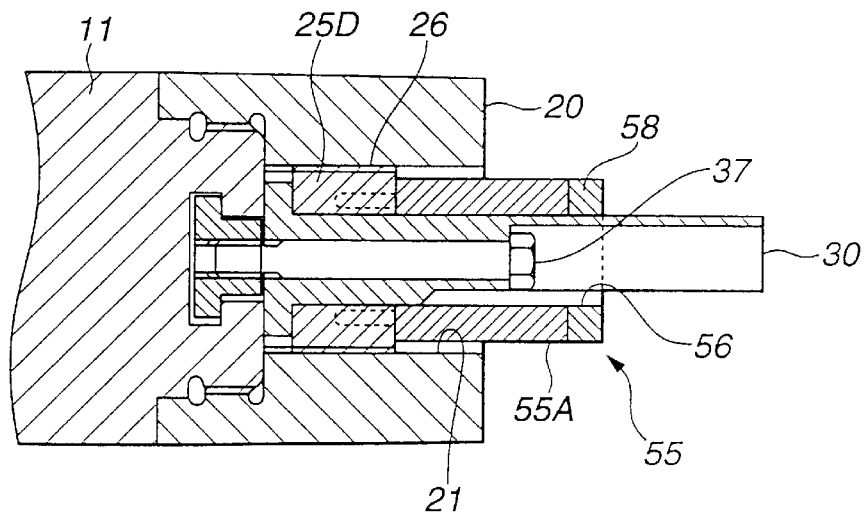
FIG. 13(a) is an axially sectioned view of an essential portion of the insert die of the fifth embodiment in a condition wherein the handling tool is in use.

The modified eccentric members 25D have different eccentric degrees "S" of the eccentric through bore 27 respectively (see FIG. 11(b)). As is seen from FIGS. 11(a) and 11(b), each modified eccentric member 25D has a serrated outer wall portion 26 throughout the length thereof and has a shorten length, so that as shown in FIG. 13(a), it can be fully put in the through bore 21 of the cap member 20. Furthermore, as is seen from FIG. 11(b), each modified eccentric member 25D is formed at one end with two blind pin holes 50 that are positioned at both aides of the eccentric through bore 27.

As is seen from FIGS. 12(a) and 12(b), the handling tool 55 comprises a cylindrical body 55A having a concentric through bore 56. As is seen from FIG. 13(a), the outer diameter of the cylindrical body 55A is smaller than that of the through bore 21 of the cap member 20, and the through bore 56 of the cylindrical body 55A is so sized as to intimately receive therein the center pin 30.

Referring back to FIGS. 12(a) and 12(b), two pins 57 are fixed to one end of the cylindrical body 55A. In the illustrated embodiment, the two pins 57 are arranged at diametrically opposed positions of the cylindrical body 55A. The other end of the cylindrical body 55A is machined to have a knurled head 58. The two pins 57 are sized and spaced to mate with the pin holes 50 of each of the modified eccentric members 25D.

For putting the eccentric member 25D into a proper position of the bore 21 of the cap member 20, the following steps are needed.

First, the handling tool 55 is coupled with a selected eccentric member 25 by deeply inserting the pins 57 into the pin holes 50 of the eccentric member 25D. Then, as is seen from FIG. 13(a), the coupled unit (25D, 55) is inserted into the bore 21 of the cap member 20 having the serration 26 of the eccentric member 25D engaged with the serration 22 of the cap member 20. Of course, before this insertion, angular position adjustment takes place between the eccentric member 25D and the bore 21 of the cap member 20.

Figure 13B:
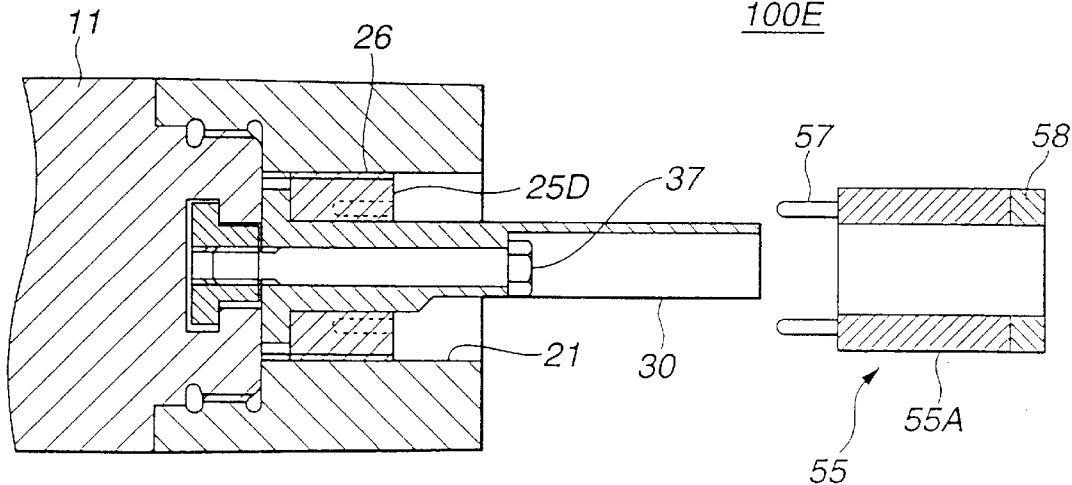
FIG. 13(b) is a view similar to FIG. 13(a), but showing a condition wherein the handling tool is not in use.

Then, the bolt 37 is fastened to tightly fix the center pin 30 to the base block 11. Then, as is shown in FIG. 13(b), the handling tool 55 is pulled and removed from the eccentric member 25D left in the cap member 20.

Because of usage of the eccentric member 25D that has a shorter length, the center member 5 (see FIG. 2) received on the center pin 30 is allowed to have a longer size.

Referring to FIGS. 14, 15(a), 15(b), 16(a), 16(b), 16(c), 17(a) and 17(b), there is shown a sixth embodiment 100F of the present invention.

Figure 14:
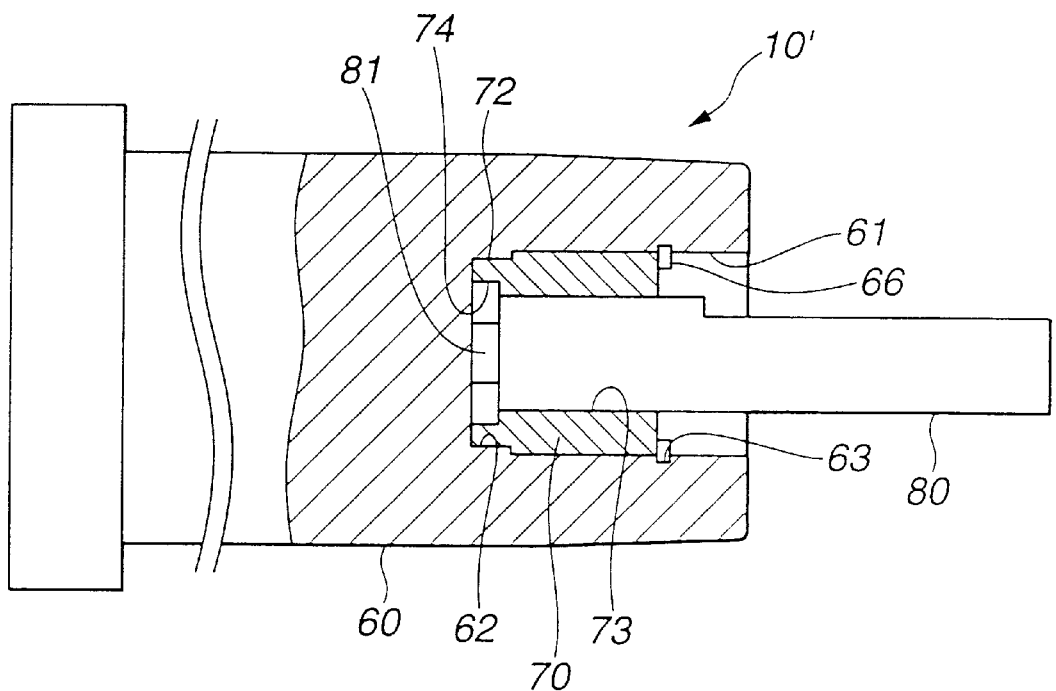
FIG. 14 is an axially sectioned view of an essential portion of an insert die installed in a molding die which is a sixth embodiment of the present invention.

FIG. 14 shows an insert die 10' in an assembled condition, that is used in the sixth embodiment 100F of the invention. Like in the case of the above-mentioned first embodiment 100A, the insert die 10' is connected to the movable die 40 (see FIG. 2).

As shown in FIG. 14, the insert die 10' comprises a cylindrical base block 60 which has a left end secured to the movable die 40, The base block 60 is formed in its right end with a cylindrical blind bore 61. Within the blind bore 61, there is received a cylindrical eccentric member 70 which corresponds to the eccentric members 25, 25B, 25C and 25D used in the above-mentioned embodiments 100A, 1001B, 100C, 100D and 100E. That is, also in this sixth embodiment 100F, a plurality of different eccentric members 70 are prepared. Each eccentric member 70 is formed with an eccentric through bore 73. The plurality of eccentric members 70 have eccentric through bores 73 whose eccentric degree "S" are different. For holding a selected eccentric member 70 in the bore 61, a snap ring 66 is used that is operatively received in an annular groove 63 formed in the cylindrical inner wall of the bore 61. Held by the eccentric member 70 is a center pin 80 that corresponds to the center pin 30 of the above-mentioned embodiments.

By changing the eccentric member 70 received in the bore 61, the angular position of the center pin 80 relative to the base block 60 changes like in the above-mentioned embodiments. Each eccentric member 70 has an octagonal left end 72 that is engaged with an octagonal recess 62 formed in the bottom of the bore 61. Thus, once the engagement is established, angular positioning of the eccentric member 70 relative to the base block 61 becomes fixed.

The center pin 80 has an octagonal left head 81 that is engaged with an octagonal recess 74 formed in the octagonal left end 72 of the eccentric member 70. The octagonal recess 74 is coaxial with the eccentric through bore 73. Thus, when the center pin 80 is received in the eccentric through bore 73 of the eccentric member 70 with its octagonal left head 81 mated with the octagonal recess 74, angular positioning of the center pin 80 relative to the eccentric member 70 becomes fixed. Since, under this condition, the octagonal left head 81 abuts against the bottom of the octagonal recess 74, removal of the center pin 80 from the eccentric member 70 is suppressed. That is, when the insert die 10' assumes an assembled condition as shown in FIG. 14, the center pin 80 is fixed to the base block 60 taking a certain angular position relative to the base block 60, that is given by the selected eccentric member 70 set in the bore 61 of the base block 60.

The detail of the sixth embodiment 100F will be much clarified from the following description.

Referring to FIGS. 15(a) and 15(b), there is shown the base block 60. The cylindrical blind bore 61 is concentric with the axis of the cylindrical base block 60. The annular groove 63 formed in the cylindrical inner wall of the bore 61 is positioned near the entrance part of the bore 61, as shown. The annular groove 63 receives therein the snap ring 66 to hold the eccentric member 70 in the deepest work position of the bore 61. As is seen from FIGS. 15(a), and 15(b), the right end of the base block 60 is provided with a reference mark 64 that is used for adjusting an angular position of the selected eccentric member 70 is inserted into the bore 61 of the base block 60. That is, like in the case of the above-mentioned embodiments, angular position adjustment between the eccentric member 70 and the bore 61 of the base block 60 is carried out with reference to both the reference mark 64 and the eccentric indication mark possessed by the eccentric member 70.

Figure 16A:
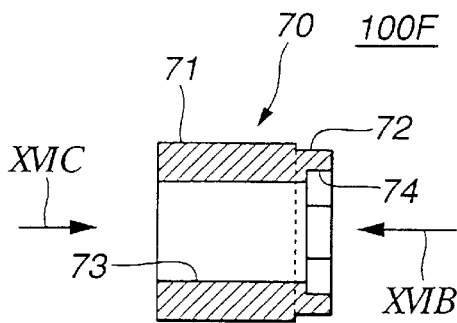
FIG. 16(a) is an axially sectioned view of an eccentric member employed in the sixth embodiment.
Figure 16B:
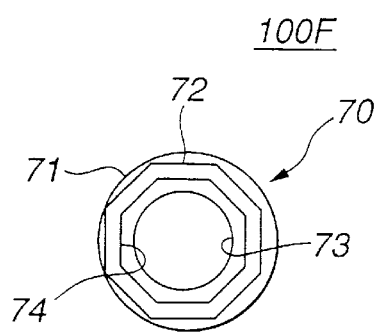
FIG. 16(b) is an end view of the eccentric member of FIG. 16(a), the view being taken from the direction of the arrow "XVIB" of FIG. 16(a)
Figure 16C:
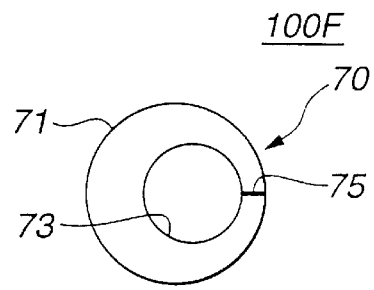
FIG. 16(c) is an opposite end view of the eccentric member of FIG. 16(a), the view being taken from the direction of the arrow "XVIC" of FIG. 16(a)

Referring to FIGS. 16(a), 16(b) and 16(c), there is shown one of the eccentric members 70. As is seen from these drawings, each eccentric member 70 comprises a cylindrical body 71 that has an eccentric through bore 73. As is seen from FIG. 16(b), the bore 73 is eccentric to the axis of the cylindrical body 71. One end of the cylindrical body 71 is projected to constitute the octagonal and 72. This octagonal and 72 is formed with the octagonal recess 74 to which the eccentric through bore 73 is exposed. As is seen from FIG. 16(c), the left end of the eccentric member 70 has an eccentric indication mark 75.

Figure 17A:
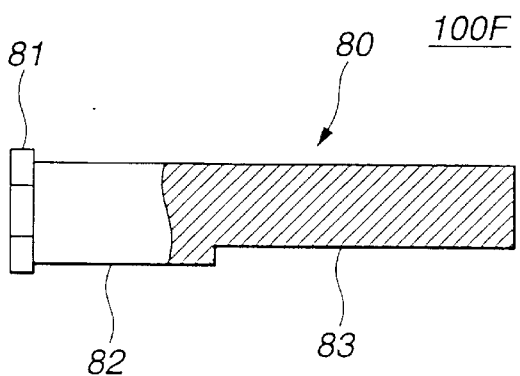
FIG. 17(a) is a partially sectioned view of a center member employed in the sixth embodiment.
Figure 17B:
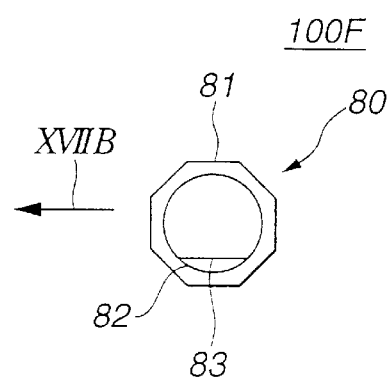
FIG. 17(b) is an end view of the center member of FIG. 17(a), the view being taken from the direction of the arrow "XVIIB" of FIG. 17(a).

Referring to FIGS. 17(a) and 17(b), there is shown the center pin 80. The Center pin 80 comprises an octagonal left head 51, a cylindrical left portion 82 and a D-sectioned elongate right portion 83.

For assembling the insert die 10', the following steps are needed.

First, by carrying out the temporary molding in such a manner as has been described in the section of the first embodiment 100A, one of the eccentric members 70 is selected and a correction angle needed by the selected eccentric member 70 is derived. Then, the center pin 80 is inserted Into the eccentric through bore 73 of the selected eccentric member 70 from the left end of the eccentric member 70 where the octagonal end 72 is provided, and the octagonal head 81 of the center pin 80 is brought into engagement with the octagonal recess 74 of the eccentric member 70. With this, a sub-assembly is provided which comprises the eccentric member 70 and the center pin 80. Then, the sub-assembly is properly inserted into the blind bore 61 of the base block 60 taking the same manner as has been mentioned in the section of the first embodiment 100A. After the octagonal end 72 of the eccentric member 70 becomes engaged with the octagonal recess 62 of the base block 60, the snap ring 66 to put into the annular groove 63. With this, the insert die 10' is finally assembled as is shown in FIG. 14.

For molding a proper fan 1, a center member 5 is received on the center pin 80 and injection molding Is carried out in such a manner as has been mentioned hereinabove. With this, it is possible to mold a fan 1 that is free of the undesired out-of-centering of the center member 5.

The entire contents of Japanese Patent Applications 11-256500 (filed Sep. 10, 1999) and 2000-255862 (filed Aug. 25, 2000) are incorporated herein by reference.

Although the invention has been described above with reference to the embodiments of the invention, the invention is not limited to the embodiments described above. Various modifications and variations of the embodiments described above will occur to those skilled in the art, in light of the above teachings.

What is claimed is:

1. A molding device for molding a rotator that has a center member embedded in a center portion of the rotator, comprising:
   a pair of molding dies which define therebetween a shaped cavity when properly coupled, said cavity being a cavity into which a molten resin is injected upon molding of said rotator;
   an insert die fixed to one of the pair of molding dies in such a manner that at least a part of the insert die is exposed to said shaped cavity when said molding dies are coupled, said insert die including:
      a base block secured to one of the pair of molding dies;
      a cylindrical holding bore defined by said base block;
      a plurality of cylindrical eccentric members having eccentric through bores whose eccentric degrees are different from one another, each cylindrical eccentric member being sized to be intimately received in said cylindrical holding bore;
      a positioning structure that establishes an angular positioning of selected one of the cylindrical eccentric members in said cylindrical holding bore relative to said base block;
      a center pin adapted to carry thereon said center member for placing said center member in said shaped cavity when the paired molding dies are coupled, said center pin having one end portion intimately received in the eccentric through bore of the selected cylindrical eccentric member held in said cylindrical holding bore; and
      a fixing structure that fixes said center pin to said base block.

2. A molding device as claimed in claim 1, in which said base block is provided with a detachable cap member, said cap member having an axially extending cylindrical through bore that serves as said cylindrical holding bore.

3. A molding device as claimed in claim 2, in which said cap member is detachably connected to a cylindrical end portion of said base block through a screw-in connection.

4. A molding device as claimed in claim 2, in which said positioning structure comprises:
   a first serration formed on a cylindrical inner surface of said cylindrical through bore of said cap member; and
   a second serration formed on a cylindrical outer surface of each of the cylindrical eccentric members, said second serration being operatively engaged with said first serration.

5. A molding device as claimed in claim 4, in which said fixing structure comprises:

a bolt bore formed in said center pin;

a groove formed in an end of said base block;

a slide nut movably received in said groove, said slide nut having a threaded bore; and a bolt passing through said bolt bore of said center pin and engaged at its threaded end with said threaded bore of said slide nut thereby to fix said center pin to said base block.

6. A molding device as claimed in claim 5, in which said center pin is formed at its one end with a flange that is sandwiched between said base block and the selected cylindrical eccentric member.

7. A molding device as claimed in claim 1, in which said center pin has a non-circular cross section at a portion where said center member is held.

8. A molding device as claimed in claim 2, in which each of said cylindrical eccentric members has a length that is greater than that of said axially extending cylindrical through bore of said cap member, whereby when the cylindrical eccentric member is properly received in said axially extending cylindrical through bore of said cap member, an end portion of said cylindrical eccentric member is exposed to the outside of said through bore.

9. A molding device as claimed in claim 2, in which each of said cylindrical eccentric members is provided with an eccentric indication mark that indicates the direction in which the cylindrical eccentric member shows the maximum eccentricity thereof, and in which said cap member is provided with a reference mark, wherein insertion of said cylindrical eccentric member into said cylindrical through bore of said cap member is carried out by adjusting a positional relation between said eccentric indication mark and said reference mark.

10. A molding device as claimed in claim 8, in which each of said cylindrical eccentric members is formed at its exposed end with a handling flange for facilitating the work for pulling out said eccentric member from said cylindrical through bore of said cap member.

11. A molding device as claimed in claim 4, in which said second serration formed on the cylindrical outer surface of each of said cylindrical eccentric members comprises axially extending teeth which are arranged about the axis of said cylindrical eccentric member at equally spaced intervals.

12. A molding device as claimed in claim 4, in which said first serration formed on said cylindrical inner surface of said cylindrical through bore of said cap member comprises axially extending teeth which are arranged about the axis of said cap member at equally spaced intervals.

13. A molding device as claimed in claim 2, in which each of said cylindrical eccentric members has a length that is smaller than that of said axially extending cylindrical through bore of said cap member, whereby when the cylindrical eccentric member is properly received in said axially extending cylindrical through bore of said cap member, no portion of said cylindrical eccentric member is exposed to the outside of said through bore.

14. A molding device as claimed in claim 13, further comprising a handling tool for facilitating the work for inserting said cylindrical eccentric member into the cylindrical through bore of said cap member.

15. A molding device as claimed in claim 14, in which said holding tool comprises:

a cylindrical body having a concentric through bore that is sized to freely receive therein said center pin; and two pins fixed to one end of said cylindrical body, said two pins being engaged with two pin holes formed in said cylindrical eccentric member when the work for inserting said cylindrical eccentric member into the cylindrical through bore of said cap member is needed.

16. A molding device as claimed in claim 1, in which said positioning structure comprises:

a first polygonal projected end provided by each of said cylindrical eccentric members; and a first polygonal recess formed in the bottom of said cylindrical holding bore, said first polygonal recess being operatively engaged with said first polygonal projected end.

17. A molding device as claimed in claim 16, in which said fixing stopper structure comprises:

a second polygonal projected end provided by said center pin;

a second polygonal recess defined by each of said cylindrical eccentric members, said second polygonal recess being operatively engaged with said second polygonal projected end;

an annular groove formed in a cylindrical inner wall of said cylindrical holding bore; and a snap ring received in said annular groove for holding said cylindrical eccentric member in said cylindrical holding bore.

18. A molding device as claimed in claim 17, in which each of the first polygonal projected end, first polygonal recess, second polygonal projected end and second polygonal recess is octagonal in shape.

19. A molding device for molding a rotator that has a center member embedded in a center portion of the rotator, comprising:

a pair of molding dies which define therebetween a shaped cavity when properly coupled, said cavity being a cavity into which molten resin is injected upon molding of the rotator;

an insert die fixed to one of the pair of molding dies in such a manner that at least a part of the insert die is exposed to the shaped cavity when said molding dies are coupled, said insert die including:

a cylindrical base block secured to one of the pair of molding dies, said base block having at one end thereof a groove;

a slide nut slidably received in said groove, said slide nut having a threaded opening:

a cap member detachably connected to one end of said base block, said cap member having an axially extending through bore to which said threaded opening of the slide nut is exposed;

a plurality of cylindrical eccentric members having eccentric through bores whose eccentric degrees are different from one another, each eccentric member having a portion that is sized to be intimately received in said through bore of said cap member;

a first serration formed on a cylindrical inner wall of the through bore of said cap member;

a second serration formed on a cylindrical outer wall of each of said cylindrical eccentric members, said second serration being operatively engaged with said first serration thereby to establish an angular positioning of selected one of the cylindrical eccentric members in the through bore of said cap member relative to said base block;

a center pin adapted to carry thereon said center member for placing said center member in said shaped cavity when the paired molding dies are coupled, said center pin having one portion intimately received in said eccentric through bore of said cylindrical eccentric member held in said through bore of said cap member, said center pin having an axially extending bolt bore; and a bolt that passes through said bolt bore of said center pin and is engaged with said threaded opening of said slide nut thereby to fix said center pin to raid base block.

20. A molding device for molding a rotator that has a center member embedded in a center portion of the rotator, comprising:

a pair of molding dies which define therebetween a shaped cavity when properly coupled, said cavity being a cavity into which molten resin is injected upon molding of the rotator;

an insert die fixed to one of the pair of molding dies in such a manner that at least a part of the insert die is exposed to the shaped cavity when said molding dies are coupled, said insert die including:

a cylindrical base block secured to one of the pair of molding dies, said base block having at one end thereof a cylindrical blind bore;

a plurality of cylindrical eccentric members having eccentric through bores whose eccentric degrees are different from one another, each eccentric member being sized to be intimately received in said cylindrical blind bore of said base block;

a center pin adapted to carry thereon said center member for placing said center member in said shaped cavity when the pair of molding dies are coupled, said center pin having one end portion intimately received in said eccentric through bore of the cylindrical eccentric member held in said cylindrical blind bore;

a first polygonal projected end provided by each of said cylindrical eccentric members;

a first polygonal recess formed in the bottom of said cylindrical blind bore, said first polygonal recess being operatively engaged with said first polygonal projected end thereby to establish an angular positioning of selected one of the cylindrical members in the cylindrical blind bore relative to said base block;

a second polygonal projected end provided by said center pin;

a second polygonal recess defined by each of said cylindrical eccentric members, said second polygonal recess being operatively engaged with said second polygonal projected end thereby to suppress rotation of said center pin relative to said cylindrical eccentric member;

an annular groove formed in a cylindrical inner surface of said cylindrical blind bore; and a snap ring pressed into said annular groove to hold said cylindrical eccentric member in said cylindrical blind bore of said base block.

* * * * *